United States Patent
Videtich (10) Patent No.: US 7,526,246 B2
(45) Date of Patent: Apr. 28, 2009

(54) METHOD AND SYSTEM FOR PULLING INFORMATION FROM A MOBILE VEHICLE WITHIN A MOBILE VEHICLE COMMUNICATIONS SYSTEMS

(75) Inventor: Matt C. Videtich, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 656 days.

(21) Appl. No.: 11/187,492

(22) Filed: Jul. 22, 2005

(65) Prior Publication Data
US 2007/0021054 A1    Jan. 25, 2007

Related U.S. Application Data

(63) Continuation of application No. 10/193,484, filed on Jul. 11, 2002, now Pat. No. 6,950,649.

(51) Int. Cl.
*H04H 40/00*    (2008.01)
(52) U.S. Cl. .................. 455/3.06; 455/3.02; 455/569.2; 455/575.9; 455/345; 340/988; 340/825.36; 340/825.49
(58) Field of Classification Search ................ 455/3.06, 455/466, 3.02, 12.1, 3.01, 569.2, 575.9, 427, 455/553, 557, 418, 426.1, 422.1, 456.1, 430, 455/352, 344, 345, 353, 414.1–414.3, 415; 340/425.5, 500, 501, 505, 517, 988, 989, 340/825.36, 825.49
See application file for complete search history.

(56) References Cited
U.S. PATENT DOCUMENTS

| | | | | |
|---|---|---|---|---|
| 5,319,374 A * | 6/1994 | Desai et al. | ................ | 342/387 |
| 5,532,702 A * | 7/1996 | Mintz | ................ | 342/463 |
| 6,389,337 B1 | 5/2002 | Kolls | ................ | 701/29 |
| 6,433,735 B1 * | 8/2002 | Bloebaum et al. | ................ | 342/357.1 |
| 6,799,201 B1 * | 9/2004 | Lee et al. | ................ | 709/217 |
| 6,909,361 B2 * | 6/2005 | McCarthy et al. | ................ | 340/425.5 |
| 2002/0022979 A1 | 2/2002 | Whipp et al. | ................ | 705/5 |
| 2002/0183059 A1 * | 12/2002 | Noreen et al. | ................ | 455/427 |
| 2003/0139179 A1 | 7/2003 | Fuchs et al. | ................ | 455/426 |
| 2003/0220835 A1 * | 11/2003 | Barnes, Jr. | ................ | 705/14 |
| 2004/0187133 A1 | 9/2004 | Weisshaar et al. | ................ | 718/100 |
| 2004/0192189 A1 * | 9/2004 | Yuhara et al. | ................ | 455/3.02 |

* cited by examiner

*Primary Examiner*—Sujatha Sharma (57) ABSTRACT

A system and method is directed to obtaining information from a mobile vehicle within a mobile vehicle communication service. The method provides creating a mobile vehicle contact list based on an information request, determining a time period to transmit the mobile vehicle contact list and the information request, transmitting the mobile vehicle contact list and the information request to the mobile vehicle at the determined time period, and receiving the information from the mobile vehicle, at a specified time, based on the information requested. The system further provides means for creating a vehicle contact list based on the information request, means for determining a time period to transmit the mobile vehicle contact list and the information request, means for transmitting the mobile vehicle contact list and the information request to the mobile vehicle at the determined time period, and means for receiving the information, at a specified time, from the mobile vehicle based on the information requested.

13 Claims, 4 Drawing Sheets

METHOD AND SYSTEM FOR PULLING INFORMATION FROM A MOBILE VEHICLE WITHIN A MOBILE VEHICLE COMMUNICATIONS SYSTEMS

RELATED APPLICATION

This application is a continuation of U.S. Ser. No. 10/193,484 filed on Jul. 11, 2002, now U.S. Pat. No. 6,950,649.

FIELD OF THE INVENTION

In general, the invention relates to data transmission over a wireless communication system. More specifically, the invention relates to a method and system for pulling information from a mobile vehicle within a mobile vehicle communication system.

BACKGROUND OF THE INVENTION

Mobile communication units (MCU's), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and FAX messages from virtually anywhere on earth. Such communication is initiated at the MCU when it is turned on, or by entering a phone number to be called, or in many cases, by pressing a preprogrammed button on the MCU or speaking a voice command causing the MCU to automatically complete the process of dialing the number to be called. A radio communication link is established between the MCU and a Wide Area Network (WAN), using a node of the WAN in the vicinity of the MCU.

In cellular telephone systems, a node is commonly referred to as a "cellular base station." Once the radio communication link between the MCU and the cellular base station has been established, the base station then utilizes a combination of additional cellular stations, conventional telephone wire line networks, and possibly even satellite systems to connect the MCU to the number to be called.

Wireless communication services for MCU users, such as navigation and roadside assistance, have increased rapidly in recent years. Most of the services that have been offered are for a motor vehicle in operation, and include services that may require location and destination information. Such services are provided at a cost to the MCU users, and also at a cost to the MCU service provider. MCU service providers must make available a wireless communication service customer assistance center (or other such manually staffed service center) in order that an operator or customer assistant may complete the MCU requests. It would be beneficial to the MCU user and service provider to offer information and services advantageous to the MCU user, yet profitable to the MCU provider without MCU user subsidies. In addition, limited MCU equipped vehicle information is currently requested or used for the immediate advantage of the MCU user.

Recently, additional services have been developed that may be beneficial to both the MCU user as well as the MCU service provider. One such service beneficial to the MCU user includes the ability of the MCU service provider to query onboard systems and components to determine how well each system is performing. Results from the query may provide the MCU service provider the ability to notify the MCU user of potential problems with the system and schedule a repair session.

Services beneficial to the MCU service provider include the ability to query additional onboard systems such as MCU user satellite radio listening habits. Unfortunately, the present process requires the MCU service provider to call every mobile vehicle and then to receive a call from every mobile vehicle. This process may result in prohibitive costs for the MCU service provider due to large call volumes, requesting the large call volumes during peak usage time, and the like.

It would be desirable, therefore, to provide a method and system that would overcome these and other disadvantages.

SUMMARY OF THE INVENTION

The present invention is directed to a system and method for pulling information from a mobile vehicle within a mobile vehicle communication system. The invention allows a service provider to generate, transmit at a desired time, and receive requested information over the mobile communication system.

One aspect of the invention provides a method for obtaining information from a mobile vehicle within a mobile vehicle communication service by creating at least one mobile vehicle contact list based on at least one information request, determining at least one time period to transmit the mobile vehicle contact list and the information request utilizing a satellite radio service, transmitting the mobile vehicle contact list and the information request, utilizing a satellite radio service, to the mobile vehicle at the at least one determined time period, and receiving the information from the mobile vehicle based on the information requested.

In accordance with another aspect of the invention, a system for obtaining information from a mobile vehicle within a mobile vehicle communication service is provided. The system includes means for creating at least one vehicle contact list based on at least one information request. The system further includes means for determining at least one time period to transmit the mobile vehicle contact list and the information request utilizing a satellite radio service. Means for transmitting the mobile vehicle contact list and the information request to the mobile vehicle at the at least one determined time period is provided. Means for receiving the information from the mobile vehicle based on the information requested is also provided.

In accordance with yet another aspect of the invention, a computer readable medium storing a computer program includes: computer readable code for creating at least one vehicle contact list based on at least one information request, computer readable code for determining at least one time period to transmit the mobile vehicle contact list and the information request, utilizing a satellite radio service, computer readable code for transmitting the mobile vehicle contact list and the information request to the mobile vehicle at the at least one determined time period, and computer readable code for receiving the information from the mobile vehicle based on the information requested.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Throughout the specification, and in the claims, the term "connected" means a direct electrical connection between the things that are connected, without any intermediate devices. The term "coupled" means either a direct electrical connection between the things that are connected, or an indirect connection through one or more passive or active intermediary devices.

The present invention relates to data transmission over a wireless communication system and more particularly to pulling information from a mobile vehicle within a mobile vehicle communication system. The present invention allows a service provider to generate, transmit over a satellite radio service at a desired time, and receive requested information over the mobile communication system.

Illustrative Operating Environment

Figure 1:
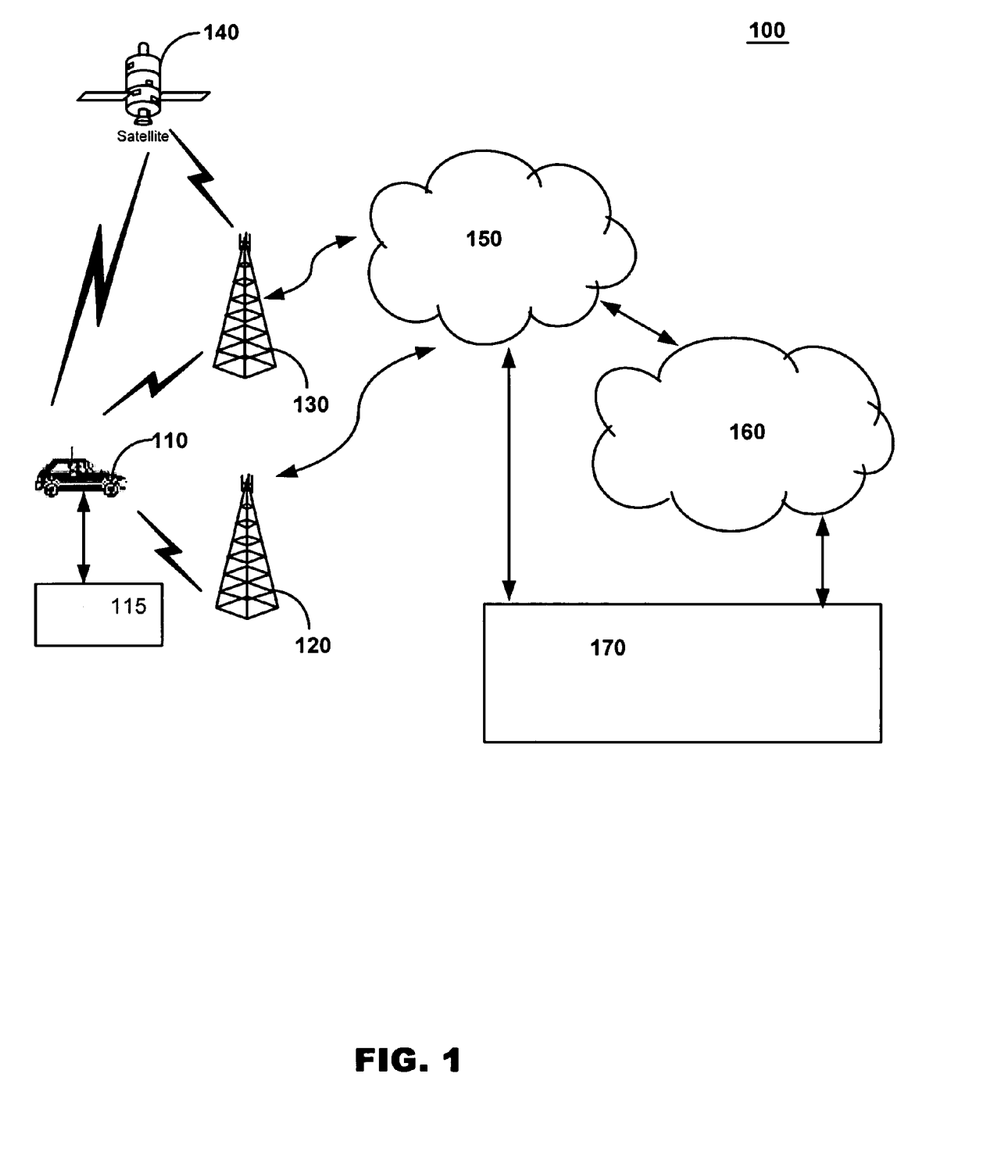
FIG. 1 is a block diagram illustrating an operating environment according to an embodiment of the present invention.

FIG. 1 is a block diagram illustrating an example of an operating environment that is in accordance with the present invention. FIG. 1 details an embodiment of a system for operating a satellite radio subscription service and a wireless communication service in a mobile vehicle, in accordance with the present invention, and may be referred to as a mobile vehicle communication system (MVCS) 100. The mobile vehicle communication system (MVCS) 100 may include one or more mobile vehicle communication units (MVCU) 110, one or more audio devices 115, one or more wireless communication systems 120, one or more radio carrier systems 130, one or more satellite broadcast systems 140, one or more communication networks 150, one or more land networks 160, and one or more service providers 170.

MCVU 110 includes a wireless vehicle communication device (module, MVCS module) such as an analog or digital phone with suitable hardware and software for transmitting and receiving data communications. In one embodiment, MCVU 110 further includes a wireless modem for transmitting and receiving data. In another embodiment, MCVU 110 includes a digital signal processor with software and additional hardware to enable communications with the mobile vehicle and to perform other routine and requested services.

In yet another embodiment, MCVU 110 includes a global positioning system (GPS) unit capable of determining synchronized time and a geophysical location of the mobile vehicle. In operation, MCVU 110 sends to and receives radio transmissions from wireless communication system 120. MCVU 110 may also be referred to as a mobile vehicle throughout the discussion below.

Audio device 115 includes hardware suitable for receiving broadcast signals within MCVU 110. In one embodiment, audio device 115 includes a receiver and receives broadcasts from wireless communication system 120, radio broadcast system 130, and satellite broadcast system 140.

In another embodiment, audio device 115 further includes a medium for storing programming information. In an example, the programming information includes customer requested programs supplied by one or more providers including various formats. Formatted programs may include such formats as "Talk," various music genres, targeted regional information, and the like. In another example, the user requested programs are provided in the form of packages and referred to as a satellite radio program subscription (SRPS).

In yet another embodiment, audio device 115 further includes an audio speaker, a synthesized voice output, an audio channel, or the like. In an example, audio device 115 is implemented, in addition to the receiver, as a set of headphones, the audio portion of a television, a display device, or the like.

In another embodiment, MCVU 110 includes a speech recognition system (ASR) module capable of communicating with audio device 115. In yet another embodiment, the module is capable of functioning as any part or all of the above communication devices and, for another embodiment of the invention, may be capable of data storage, and/or data retrieval, and/or receiving, processing, and transmitting data queries. In one example, audio device 115 includes a speech recognition system (ASR) module.

Wireless communications system 120 is a wireless communications carrier or a mobile telephone system and transmits to and receives signals from one or more MCVU 110. Wireless communication system 120 incorporates any type of telecommunications in which electromagnetic waves carry signal over part of or the entire communication path. In one embodiment, wireless communication system 120 is implemented as any type of broadcast communication in addition to those of radio broadcast system 130 and satellite broadcast system 140. In another embodiment, wireless communications system 120 is implemented as a single unit in conjunction with radio broadcast system 130. In another embodiment, wireless communications system 120 is implemented via coupling with radio broadcast system 130, or in some such other configuration as would allow the systems to function as described.

In one example, such wireless communication carrier is a short message service, modeled after established protocols such as IS-637 SMS standards, IS-136 air interface standards for SMS, and GSM 03.40 and 09.02 standards. Similar to paging, an SMS communication could be broadcast to a number of regional recipients.

In another example, the mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

Radio broadcast system 130 transmits radio signals with data to audio device 115 within MCVU 110. In one embodiment, radio broadcast system 130 transmits analog audio and/or video signals. In an example, radio broadcast system 130 transmits analog audio and/or video signals such as those sent from AM and FM radio stations and transmitters, or digital audio signals in the S band (approved for use in the U.S.) and L band (used in Europe and Canada).

In another embodiment, audio device 115 stores or retrieves data and information from the audio and/or video signals of radio broadcast system 130. In an example, audio device 115 retrieves terrestrial digital radio signals from a signal received from radio broadcast system 130.

Satellite broadcast system 140 transmits radio signals to audio device 115 within MCVU 110. In one embodiment, satellite broadcast system 140 may broadcast over a spectrum in the "S" band (2.3 GHz) that has been allocated by the U.S. Federal Communications Commission (FCC) for nationwide broadcasting of satellite-based Digital Audio Radio Service (DARS). In an example, satellite broadcast system 140 may be implemented as XM Satellite Radio.

In operation, broadcast services provided by radio broadcast system 130 and satellite broadcast system 140 are received by audio device 115 located within MCVU 110. Broadcast services include various formatted programs based on a package subscription obtained by the user and managed by the audio device 115 and referred to above.

Communications network 150 is implemented as any suitable system or collection of systems for connecting wireless communications system 120 to at least one MCVU 110 or to a service provider 170. In one embodiment, communications network 150 includes a mobile switching center and provides services from one or more wireless communications companies.

Land network 160 connects communications network 150 to service provider 170. In one embodiment, land network 160 is implemented as a public-switched telephone network, a wired network, an optical network, a fiber network, another wireless network, or any combination thereof. In an example, land network 160 includes an Internet protocol (IP) network. In another embodiment, an MCVU 110 utilizes all or part of the wireless communications system 120, communications network 150, and land network 160.

In yet another embodiment, land network 160 connects one or more communications systems 120 to one another. In another embodiment, communication network 150 and land network 160 connect wireless communications system 120 to a communication node or service provider 170.

Service provider 170 is implemented as one or more locations where communications may be received or originate to facilitate functioning of the mobile vehicle communication system (MCVS) 100. Service provider 170 may contain any of the previously described functions.

In one embodiment, service provider 170 is implemented as a call center, as known in the art. In an example, the call center is implemented as a voice call center, providing verbal communications between an advisor in the call center and a subscriber in a mobile vehicle. In another example, the call center is implemented as a voice activated call center, providing verbal communications between an ASR unit and a subscriber in a mobile vehicle. In yet another example, the call center is implemented as a virtual call center, providing virtual communications between a virtual advisor and a user interface. In another embodiment, the call center contains any of the previously described functions.

In operation, a service provider 170 utilizes one or more portions of the aforementioned communications network to communicate subscriber requested programming to audio device 115. The subscriber requested programming may then be accessed to by audio device 115 utilizing one or more radio broadcast system 130 and satellite broadcast system 140 segments.

Figure 2:
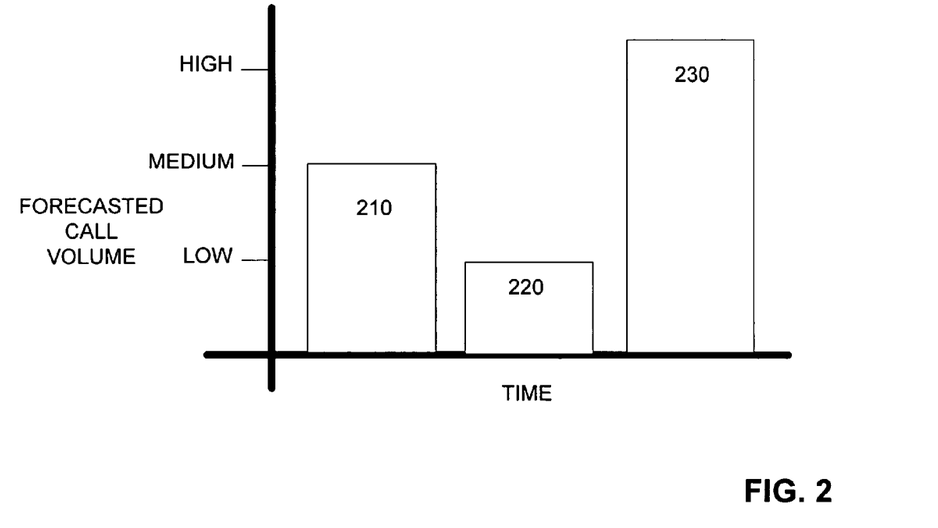
FIG. 2 is a graph illustrating an example of forecasted call volume in accordance with the present invention.

FIG. 2 is a graph illustrating an example of forecasted wireless call volume in accordance with the present invention. FIG. 2 details wireless call volumes at various time segments over a given time period. FIG. 2 includes an x-axis, a y-axis, and call blocks 210, 220, and 230. In FIG. 2, the x-axis represents time and the y-axis represents forecasted wireless call volumes. The call blocks each represent a forecasted wireless call volume over a specific time period.

In one embodiment, the graph illustrated in FIG. 2 represents forecasted wireless call volumes (y-axis) throughout time periods (x-axis) on a given day. In one example, call block 210 represents Friday morning wireless call volumes, call block 220 represents Friday mid day wireless call volumes, and call block 230 represents Friday afternoon wireless call volumes.

FIG. 2 illustrates potential problems associated with a user employing the wireless portion of mobile vehicle communication system (MCVS) 100. That is, information desired by the user is only available to be requested and received, utilizing the wireless portion of MCVS 100, while a mobile vehicle communication unit (MVCU) 110 is active.

Unfortunately, a majority of user desired wireless time periods coincide with peak wireless volume time periods such as is represented by call block 230 of FIG. 2. Use of the wireless portion of MCVS 100 during a peak wireless volume time period results in an increase in cost to the user when compared to usage during a non-peak wireless volume time period. Therefore, additional use of MCVS 100 during a peak wireless volume time period is discouraged.

Figure 2A:
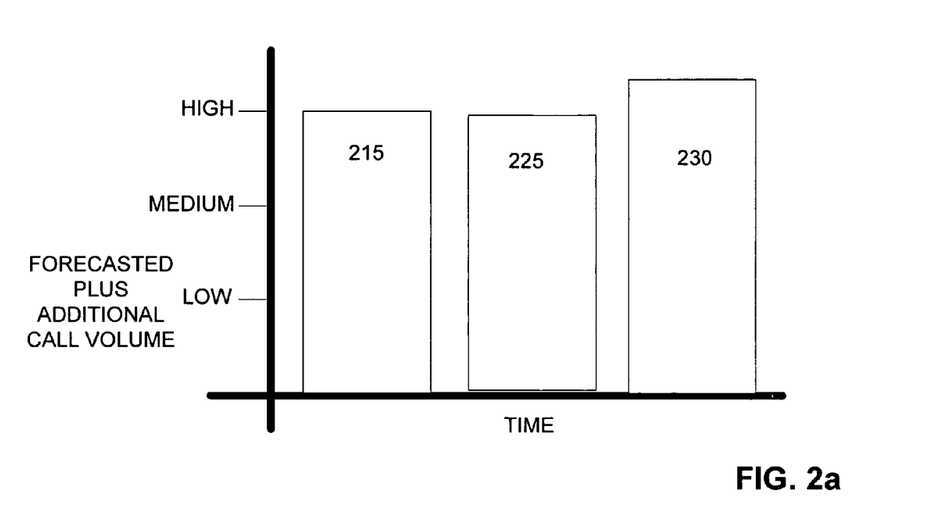
FIG. 2a is a graph illustrating another example of forecasted call volume in accordance with the present invention.

FIG. 2a is a graph illustrating an example of forecasted plus additional wireless call volumes in accordance with the present invention. FIG. 2a details wireless call volumes at various time segments over a given time period. Like components from FIG. 2 and FIG. 2a are labeled identically.

FIG. 2a includes an x-axis, a y-axis, and call blocks 215, 225, and 230. In FIG. 2a, the x-axis represents time and the y-axis represents forecasted plus additional wireless call volumes. The call blocks each represent a total wireless call volume over a specific time period, with the total wireless call volume defined as the forecasted wireless call volume plus additional wireless call volume.

In one embodiment, the graph illustrated in FIG. 2a represents total wireless call volumes (y-axis) throughout time periods (x-axis) on a given day. In one example, call block 215 represents Friday morning total wireless call volumes and call block 225 represents Friday mid day total wireless call volumes when utilizing the present invention.

Figure 3:
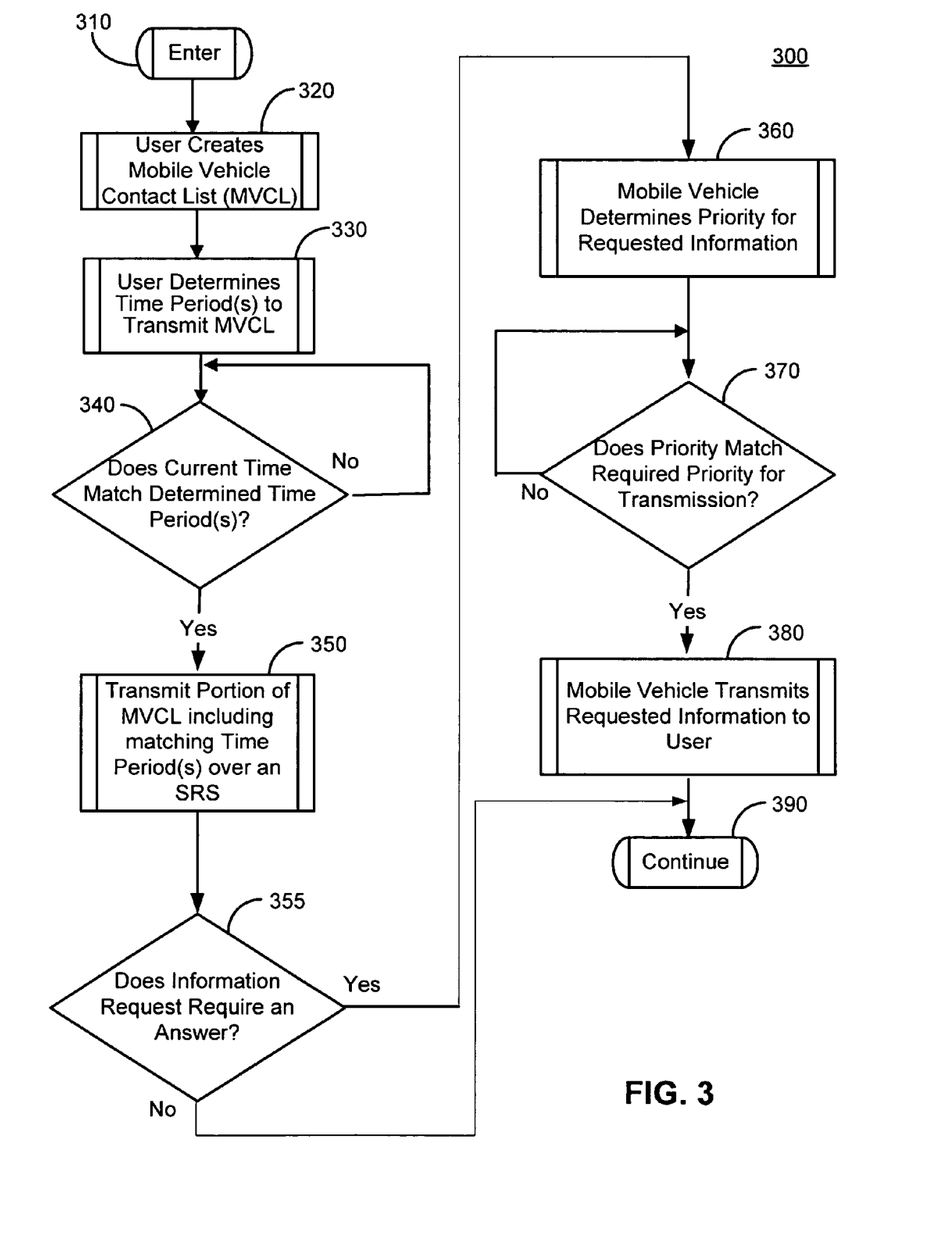
FIG. 3 is a flow diagram depicting an exemplary embodiment of code on a computer readable medium in accordance with the present invention.
Figure 4:
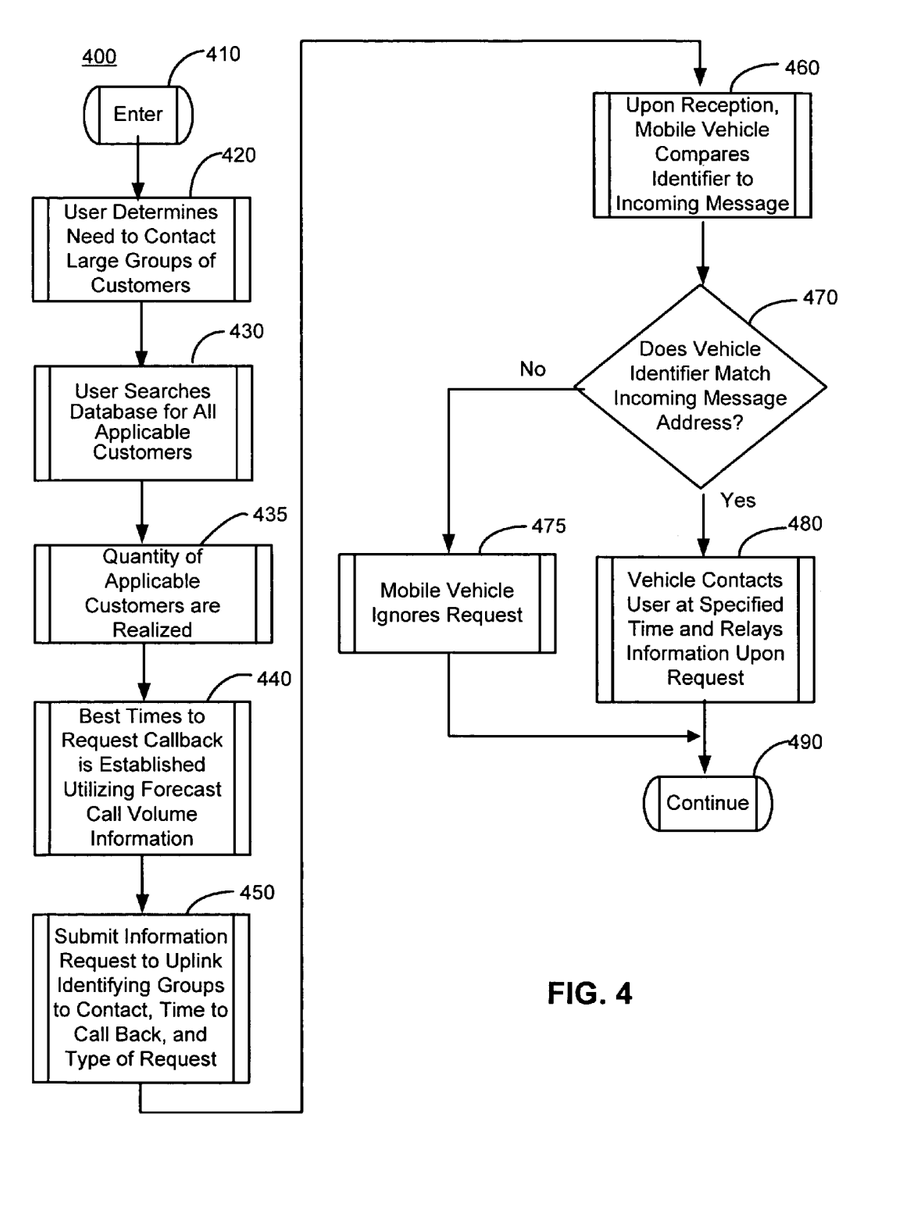
FIG. 4 is a flow diagram depicting another exemplary embodiment of code on a computer readable medium in accordance with the present invention.

FIG. 2a represents potential results of implementing the present invention as discussed in FIGS. 3 and 4 below. It is an object of the present invention for the user to obtain desired information while utilizing non-peak wireless time periods. FIGS. 3 and 4 below detail the ability of the user, utilizing the present invention, to discontinue use of or time shift use of the wireless portion of MCVS 100.

Exemplary Information Request and Reception

FIG. 3 is a flow diagram depicting an exemplary embodiment of code on a computer readable medium in accordance with the present invention. FIG. 3 details an embodiment of a method 300 for obtaining information from a mobile vehicle within a mobile vehicle communication service, in accordance with the present invention. Method 300 may utilize one or more systems detailed in FIG. 1 above. Method 300 may also utilize graphs detailed in FIGS. 2 and 2a above.

Method 300 begins at block 310 where a user determines a need to obtain information from a mobile vehicle within a mobile vehicle communication service (MVCS). Method 300 allows the user to request information from the mobile vehicle that includes at least one user defined priority for return of the requested information. Method 300 further allows the mobile vehicle to determine one or more time periods to transmit the information request based on the included user defined priorities.

For example, the user may determine the need to obtain details of customers listening habits at a particular time period(s) throughout the day, the user may determine the need to obtain information relating to specific types of equipment performance, and the like. In this example, the user would also assign at least one priority for return of the information based on the importance and need of receiving the information.

In one embodiment, the mobile vehicle communication service is implemented as the MVCS 100 of FIG. 1.

In another embodiment, the user is implemented as service provider 170 as known in the art and detailed in FIG. 1 above. In yet another embodiment, the user is implemented as a call center as known in the art. Method 300 then advances to block 320.

At block 320, the user creates one or more mobile vehicle contact lists (MVCL) based on the required information and available mobile vehicles from which to draw the information. In an example, information to be obtained is satellite radio customer listening habits. In another example, information to be obtained is performance data of a specific engine and transmission combination, where specific engine and transmission combinations are identified by a mobile vehicle identification number (VIN).

The available mobile vehicles may be organized into one or more mobile vehicle databases depending on specific organizational criteria. The MVCL is a subset of one or more mobile vehicle databases. In an example, the mobile vehicle database is selected from a group including: a satellite radio identification number, a mobile vehicle identification number, a mobile vehicle communication unit identification number, a satellite radio user characteristic, and a geographic characteristic.

In one embodiment, the MVCL is created by the user identifying the information to be obtained, selecting a mobile vehicle database that corresponds to the information to be obtained, and producing the MVCL from the selected mobile vehicle database.

In a further embodiment, producing the MVCL includes the user comparing criteria of the information to be obtained to the mobile vehicle database and identifying elements of the mobile vehicle database that match the criteria of the information to be obtained. The method then advances to block 330.

At block 330, the user determines one or more time periods to transmit the MVCL utilizing the satellite radio service portion of mobile vehicle communication service (MVCS) 100. Time periods for transmitting the MVCL are determined based on one or more timing elements within the information to be obtained. Timing elements may be specific or nonspecific.

Specific timing elements are those that require the transmission of the information request within a specified time period, such as a request for a customer's satellite radio listening habits. Nonspecific timing elements are those that do not require the transmission of the information request within a specified time period, such as performance data of specific engine and transmission combinations.

In one embodiment, time periods are determined by analyzing one or more portions of the information to be obtained to determine a timing element for each portion, and associating a time period with each timing element. In another embodiment and discussed in block 360 and described in block 440 of FIG. 4, the user may also determine and assign a time period to receive transmission from the mobile vehicle. The method then advances to decision block 340.

At decision block 340, method 300 compares each determined time period of block 330 with a current time index. If the current time index matches a determined time period then the method advances to block 350. If the current time index does not match the determined time period then method 300 returns to decision block 340.

At block 350, portions of the MVCL including timing elements within the time period matching the current timing index are transmitted over the mobile vehicle communication service (MVCS) 100. In one embodiment, the MVCL including timing elements within the time period matching the current timing index are transmitted utilizing the satellite radio portion of the mobile vehicle communication service (MVCS) 100. In another embodiment, the MVCL including timing elements within the time period matching the current timing index are transmitted utilizing the terrestrial digital radio portion of the mobile vehicle communication service (MVCS) 100.

In an example, the transmission of the MVCL utilizing the MVCS 100 reduces wireless communication usage of the MVCS by a substantial amount as all outgoing transmissions are implemented by the satellite radio portion or the terrestrial portion of the MVCS 100. The method then advances to decision block 355.

At decision block 355, the mobile vehicle determines if the information request requires the mobile vehicle to transmit an answer and is referred to as a mobile vehicle contact list determination. If the mobile vehicle determines that a transmission is required then the mobile vehicle retrieves the requested information and the method advances to block 360. If the mobile vehicle does not determine that a transmission is required then the method advances to block 390.

In one embodiment, information requested requires the mobile vehicle to transmit an answer to the user utilizing the wireless portion of the mobile vehicle communication service (MVCS) 100. In another embodiment, the mobile vehicle determines it is not required to transmit an answer to the user. In one example, the information request may query all vehicles within a given geographic area whose customers are currently listening to a specified station on the satellite radio network.

In this example, only mobile vehicle's whose customers are currently complying with the information request are required to retrieve and transmit requested information. Such information requested for transmission may include identifying a start time for listening to the requested station, duration of time tuned to the specific station, and the like.

At block 360, the mobile vehicle analyzes each information request and assigns a timing priority. Timing priorities may be supplied by the user or may be determined by the mobile vehicle based on criteria within the information request and the level of call volume within the mobile vehicle communication service (MVCS) 100, referred to as a current mobile vehicle communication service call volume.

In one embodiment and detailed in block 440 of FIG. 4 below, the user assigns a high priority to an information request, prior to transmission, due to an urgent need for receipt of the information. In another embodiment, the mobile vehicle assigns a high or low priority based on the requested information and the current mobile vehicle communication service call volume. The method then advances to decision block 370.

At decision block 370, the mobile vehicle determines if the assigned priority matches or exceeds a required priority for transmission. If the assigned priority matches or exceeds the required priority for transmission, the method advances to block 380. If the assigned priority does not match or exceed the required priority for transmission, the method returns to block 370.

In one embodiment, required priorities are user supplied and designed to reduce communication between the mobile vehicle and the user over the wireless portion of the mobile vehicle communication service (MVCS) during peak wireless call volume periods as described in FIGS. 2 and 2a above.

At block 380, the mobile vehicle transmits the requested information to the user utilizing the wireless portion of the mobile vehicle communication service (MVCS). In one embodiment, the mobile vehicle transmits the requested information during a peak wireless call volume period 230 as represented in FIGS. 2 and 2a based on an assigned priority level matching or exceeding the priority level required to transmit at that time.

In another embodiment, the mobile vehicle transmits the requested information during non-peak wireless call volume periods 215 and 225 as represented in FIG. 2a based on an assigned priority level matching or exceeding the priority level required to transmit at non-peak times. The method then advances to block 390, where it returns to standard programming.

FIG. 4 is a flow diagram depicting another exemplary embodiment of code, referred to as a program, on a computer readable medium in accordance with the present invention. FIG. 4 blocks function like similarly described FIG. 3 blocks. FIG. 4 details an embodiment of a method 400 for obtaining information from a mobile vehicle within a mobile vehicle communication service, in accordance with the present invention. Method 400 may utilize one or more systems detailed in FIG. 1 above. Method 400 may also utilize graphs detailed in FIGS. 2 and 2a above.

Method 400 begins at block 410 where a user determines a need to obtain information from a group of customers and receive the requested information at a user specified time period. For example, the user may determine a need to offer customers of a particular category a special promotional offer. Method 400 then advances to block 420.

At block 420, the user determines the group of customers to be contacted is a large group. In one example, the large group to be contacted allows use of a mobile vehicle communication service (MVCS) to reduce transmission costs. The method then advances to block 430.

At block 430, the user searches available databases to determine applicable customers to be contacted. The method then advances to block 435. At block 435, the user realizes a quantity of applicable customers. In one embodiment, blocks 430 and 435 may be accomplished as in block 320 of FIG. 3. In one example, the quantity of applicable customers is one or more subsets of a Cadillac Deville set. These subsets include a subset each of Deville, Deville Lux, and Deville Touring. In this example, the subsets are determined by analyzing each vehicle identification number within the available databases for specific information. The method then advances to block 440.

At block 440, the user establishes one or more best times to request callback utilizing forecast call volume information and includes the best times information within the information request. In one embodiment, the best times are assigned as a priority value allowing the user to determine one or more time periods when the mobile vehicle will return the requested information based on the user's needs and projected call volumes. In another embodiment, the user assigns one or more specific callback time periods when the mobile vehicle will transmit the requested information. The method then advances to block 450.

At block 450, the user submits the information request to an uplink for satellite radio transmission throughout the mobile vehicle communication service (MVCS) 100. The submission includes a definition of groups to contact, time period to return the requested information, and the type of information requested. The definition of groups to contact includes one or more group identifiers.

In one embodiment, each mobile vehicle within the MVCS includes at least one group identifier based on the mobile vehicle's characteristics, customer characteristics, and the like. In one example, the definition of the group to contact is determined by the group identifier defined as a vehicle identification number (VIN). The method then advances to block 460.

At block 460, the mobile vehicle receives the transmission and accompanying information request and compares one or more of the mobile vehicle's identifiers to the group identifier contained within the information request. The method then advances to decision block 470.

At decision block 470, the mobile vehicle determines if the comparison of the group identifier produced a match to any of the mobile vehicle's identifiers. If the mobile vehicle determines that at least one match was produced then the method advances to block 480. If the mobile vehicle determines that no matches were produced then the method advances to block 475. At block 475, the mobile vehicle ignores the information request. The method advances to block 490.

At block 480, the mobile vehicle determines and collects the requested information. The mobile vehicle then transmits the requested information at the user requested time period. In one embodiment, block 480 may be accomplished as in block 380 of FIG. 3. The method then advances to block 490 where it returns to standard programming.

The above-described methods and implementation for pulling information from a mobile vehicle within a mobile vehicle communication system are example methods and implementations. These methods and implementations illustrate one possible approach for pulling information from a mobile vehicle within a mobile vehicle communication system. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

I claim:

1. A method for communicating with a first vehicle within a service comprising:
   identifying vehicles within the service;
   identifying a set of the vehicles within the service from which information is desired, wherein the first vehicle is a member of the set;
   creating a message having identification information corresponding to the set of the vehicles and a request common to the set of the vehicles;
   transmitting the message using a satellite broadcast, wherein at least a subset of the set of the vehicles accept the transmitted message using the identification information, wherein the first vehicle is within the subset;
   in response to the message, transmitting data to the service from the first vehicle within the subset and additional vehicles within the subset, wherein the satellite broadcast is used to schedule retrieval of the data from the set of vehicles.

2. The method according to claim 1, wherein the identification information comprises a group identifier.

3. The method according to claim 2, wherein the group identifier comprise information from a satellite radio identification number, a vehicle identification number, a satellite radio user characteristic and a geographic characteristic.

4. The method according to claim 2, wherein the group identifier comprises vehicle identification number information, wherein the vehicle identification number information is used to identify the set of the vehicles.

5. The method according to claim 1 wherein the message is related to at least one vehicle model in the set of vehicles.

6. The method according to claim 1 wherein the identification information identifies a vehicle model.

7. A method for communicating with a first vehicle within a service comprising:
identifying vehicles within the service;
identifying a first set of the vehicles within the service from which information is desired, wherein the first vehicle is a member of the set;
creating a first message having first identification information corresponding to the first set of the vehicles and first response timing information;
transmitting the first message using a satellite broadcast, wherein at least a first subset of the first set of the vehicles accept the transmitted first message using the first identification information, wherein the first vehicle is within the first subset;
in response to the first message and the first response timing information, transmitting first data to the service from the first vehicle within the first subset and additional vehicles within the subset, wherein the satellite broadcast is used to schedule retrieval of the data from the first set of vehicles.

8. A method according to claim 7, also comprising:
identifying a second set of the vehicles within the service from which information is desired;
creating a second message having second identification information corresponding to the second set of the vehicles and response timing information;
transmitting the second message using the satellite broadcast, wherein at least a second subset of the second set of the vehicles accept the transmitted second message using the second identification information;
in response to the second message and the second response timing information, transmitting second data to the service from vehicles within the second subset, wherein timing of communications with vehicles within the service is managed.

9. The method according to claim 7, wherein the first identification information comprises a group identifier.

10. The method according to claim 9, wherein the group identifier comprise information from a satellite radio identification number, a vehicle identification number, a satellite radio user characteristic and a geographic characteristic.

11. The method according to claim 9, wherein the group identifier comprises vehicle identification number information, wherein the vehicle identification number information is used to identify the first set of the vehicles.

12. The method according to claim 1 wherein the first message is related to at least one vehicle model in the first set of vehicles.

13. The method according to claim 1 wherein the first identification information identifies a vehicle model.

* * * * *